(12) United States Patent
Itou et al.

(10) Patent No.: US 7,690,992 B2
(45) Date of Patent: Apr. 6, 2010

(54) VIDEO GAME PROCESSING APPARATUS, A METHOD AND A COMPUTER PROGRAM PRODUCT FOR PROCESSING A VIDEO GAME

(75) Inventors: Hiroyuki Itou, Tokyo (JP); Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 634 days.

(21) Appl. No.: 11/674,297

(22) Filed: Feb. 13, 2007

(65) Prior Publication Data

US 2007/0213107 A1 Sep. 13, 2007

(30) Foreign Application Priority Data

Mar. 10, 2006 (JP) ............................. 2006-066554

(51) Int. Cl.
 *A63F 13/00* (2006.01)
(52) U.S. Cl. .............................. 463/31; 463/8; 463/30; 463/32; 463/42
(58) Field of Classification Search .................... 463/8, 463/30, 31, 32, 42
 See application file for complete search history.

(56) References Cited

U.S. PATENT DOCUMENTS

| 6,210,273 | B1 | 4/2001 | Matsuno |
| 6,354,940 | B1 | 3/2002 | Itou et al. |
| 6,409,604 | B1 | 6/2002 | Matsuno |
| 6,439,998 | B1 | 8/2002 | Itou |
| 6,533,663 | B1 * | 3/2003 | Iwao et al. ..................... 463/32 |
| 6,666,764 | B1 * | 12/2003 | Kudo ............................. 463/8 |
| 2002/0103031 | A1 * | 8/2002 | Neveu et al. ................... 463/49 |
| 2002/0142834 | A1 * | 10/2002 | Sobue ......................... 463/30 |
| 2004/0176163 | A1 | 9/2004 | Ishihata et al. |
| 2005/0176503 | A1 | 8/2005 | Sakamoto et al. |
| 2006/0287027 | A1 * | 12/2006 | Hardisty et al. ................ 463/8 |
| 2007/0026944 | A1 | 2/2007 | Maehiro et al. |

(Continued)

FOREIGN PATENT DOCUMENTS

JP 6-105959 4/1994

(Continued)

OTHER PUBLICATIONS

"Play Station", vol. 344, Media Works Inc., Mar. 10, 2006, pp. 18-19 including a partial translation thereof.

(Continued)

*Primary Examiner*—James S McClellan
(74) *Attorney, Agent, or Firm*—Greenblum & Bernstein, P.L.C.

(57) ABSTRACT

When an action content command and an action target character is received, a control section and a graphics processor identify action executing standby time in accordance with a predetermined time identifying rule. The control section and the graphics processor then identify an action executable range in which a player character can execute the received action content in accordance with a predetermined range identifying rule, and determines whether or not an action target character that is a target of the received action content exists within the identified action executable range. The control section and the graphic processor execute the received action content against the action target character in the case where it is determined that the action target character exists within the action executable range when action executing standby time is clocked.

16 Claims, 8 Drawing Sheets

U.S. PATENT DOCUMENTS

2007/0060347 A1   3/2007   Itou

FOREIGN PATENT DOCUMENTS

| JP | 2794230 B2 | 6/1998 |
| JP | 2000-084242 | 3/2000 |
| JP | 2000-296267 | 10/2000 |
| JP | 2001-009156 A | 1/2001 |
| JP | 2004-337305 A | 12/2004 |
| JP | 2007-29571 | 2/2007 |

OTHER PUBLICATIONS

English language abstract of JP 6-105959.
English language abstract of JP 2000-296267.
English language Partial Translation of JP 2007-29571 A.
English language Abstract of JP 2001-009156 A.
English language Abstract of JP 2004-337305 A.
English language Abstract of JP 6-105959 A.
"Syukan Fami-Tsu, Jun. 4 Issue, vol. 19, No. 23," Enterbrain Inc., Jun. 4, 2004, pp. 32-35, accompanied by an English language partial translation thereof.
"DENGEKI PlayStation, vol. 10, No. 15," Media Works Inc., Jun. 11, 2004, pp. 54-61.
English language Abstract of JP 2003-154163 A.

* cited by examiner

FIG. 5

INFORMATION TABLE FOR CHARACTER EXISTING IN FIELD

| | HIT POINT | MAGIC POINT | CURRENT POSITION | AVAILABILITY OF ACTION TARGET | PROPERTY | STATUS EFFECT | ...... |
|---|---|---|---|---|---|---|---|
| CHARACTER A | 200/350 | 80/120 | ... | P | FRIEND | | ...... |
| CHARACTER B | 286/315 | 0 / 0 | ... | AVAILABLE | FRIEND | | ...... |
| CHARACTER C | 250/280 | 280/320 | ... | AVAILABLE | FRIEND | | ...... |
| CHARACTER D | 80/80 | 0 / 0 | ... | AVAILABLE | ENEMY | | ...... |
| CHARACTER E | 80/80 | 0 / 0 | ... | AVAILABLE | ENEMY | POISON | ...... |
| CHARACTER F | 80/80 | 0 / 0 | ... | NO AVAILABLE | ENEMY | | ...... |
| CHARACTER G | 100/100 | 50/50 | ... | AVAILABLE | NEUTRAL | | ...... |
| CHARACTER H | 150/150 | 80/80 | ... | NO AVAILABLE | ENEMY | | ...... |
| ... | ... | ... | ... | ... | ... | ... | ...... |

FIG. 7

PLAYER CHARACTER STATUS INFORMATION TABLE

| HP | 200/350 |
|---|---|
| MP | 80/120 |
| LV | 8 |
| EQUIPPED WEAPON | WEAPON C |
| STANDARD ATTACK RANGE | FORWARD 5 m, WIDTH 3 m |
| STANDARD STANDBY TIME | 6.0 SECOND |
| ⋮ | ⋮ |

FIG. 8

WEAPON INFORMATION TABLE

| NAME | OFFENSIVE POWER | ATTACK ADDING RANGE | ............ |
|---|---|---|---|
| WEAPON A | 1 | FORWARD 0 m, WIDTH 0 m | ............ |
| WEAPON B | 3 | FORWARD 0.2 m, WIDTH 0 m | ............ |
| WEAPON C | 8 | FORWARD 0.3 m, WIDTH 0 m | ............ |
| WEAPON D | 10 | FORWARD 0.5 m, WIDTH 0.2 m | ............ |
| WEAPON E | 12 | FORWARD 0.6 m, WIDTH 0.3 m | ............ |
| ⋮ | ⋮ | ⋮ | ⋮ |

FIG. 10

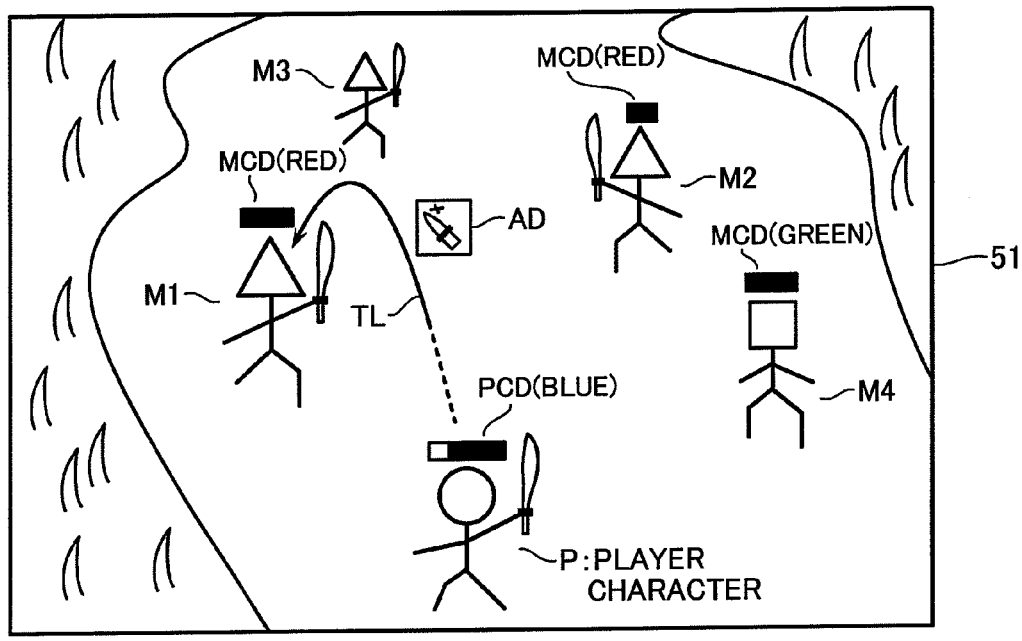

FIG. 11

TARGET LINE (TL)

| LINE COLOR | CONTENT |
| --- | --- |
| RED | CHARACTER AT STARTING POINT OF TL ATTACKS A CHARACTER POINTED OUT BY TL |
| BLUE | CHARACTER AT STARTING POINT OF TL SUPPLEMENTARILY ATTACKS A CHARACTER POINTED OUT BY TL |
| YELLOW | CHARACTER AT STARTING POINT OF TL SUPPLEMENTARILY PROTECTS A CHARACTER POINTED OUT BY TL |
| GREEN | CHARACTER AT STARTING POINT OF TL RESTORES A CHARACTER POINTED OUT BY TL |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-066554, filed on Mar. 10, 2006, the disclosure of which is expressly incorporated herein by reference in its entirety.

BACKGROUND OF THE INVENTION

1. Field of the Invention

The present invention relates to a technique for controlling progress of a video game by displaying multiple characters including a player character on an image display screen of an image display apparatus, and by controlling an action of the characters displayed on the image display screen in response to operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

In a RPG, generally, a player character acting in response to operations by the player wins a battle against an enemy character thwarting accomplishment of a predetermined object in the RPG, by which various benefits such as an experiential value are supplied to the player character. In a RPG, heretofore, various kinds of ingenuity are worked out in order to improve realism of an action scene. For example, an "active time battle" (that is, generally called "ATB") system that is developed from a turn system in which one of a player character side and an enemy character side attack the other alternately is known (for example, see Japanese Patent Application Publication No. 6-105959). In the ATB system, a player is allowed to input a battle command to instruct a battle action for a character on condition that standby time defined for each character elapses from the time when a battle action against the character is terminated. The elapse of the standby time is then informed of the player using a time gauge displayed on the screen. Further, heretofore, it has been proposed to change a time configuration (time setting) of standby time in the ATB system (for example, see Japanese Patent Application Publication No. 2000-296267).

Moreover, heretofore, a battle against an enemy character has been an additional event to thwart the accomplishment of the predetermined object in the RPG. For this reason, a battle mode in which the player character battles the enemy character on a battle field has been provided in addition to a movement mode in which the player character is moved on a movement field, and the movement field and the battle field have been distinguished (separated) completely.

More specifically, for example, when predetermined battle mode shifting conditions are met while the player character is moved on the movement field, the movement field is shifted to the battle field. Namely, the scene that is displayed on the image screen (that is, scene) is shifted from the movement field to the battle field, and the player character and the enemy character(s) are displayed on the battle field in a state that they stand face to face. After the scene is shifted to the battle field, the scene is not returned to the movement field until the battle is terminated, and therefore, the player character cannot be moved on the movement field.

In this case, multiple friend characters (that is, playable characters including the player character that is a main character) and multiple enemy characters may be displayed on the battle field. When many characters are displayed on the battle field, it is difficult for the player to accurately grasp a state of each of the many characters displayed on the battle field. For this reason, the player may mistakenly operate, and the player character will not execute an action intended by the player (for example, an attack, a recovery, a supplemental defense, a supplemental attack or the like), by which a problem that this lowers interest of the player may occur (that is, such mistaken operations may cause the player to lose interest in the game).

In the ATB system as described above, a player just selects a specific command from a group of battle commands prepared in advance, by which a battle action content of a player character is merely determined. In addition, in the ATB system, once the player selects and specifies the specific command, the specific command is merely executed in accordance with a predetermined rule. Thus, the player cannot specify or determine the timing of executing the selected specific command. Therefore, there is a problem that the battle action in a battle scene is lacking variety.

Further, in the conventional techniques described above, the battle field and the movement field are provided separately. For this reason, in the case where the battle mode shifting conditions are met while the player character is moved on the movement field, the scene is shifted from the movement field to the battle field in each case. Therefore, there is a problem that realism (realistic sensation) may be lost in the video game.

Moreover, in the case where the battle mode shifting conditions are met while the player character is moved on the movement field, the player has to wait until the period of time required to switch the fields (for example, the period of time obtained by adding the period of time for switching the scenes and the period of time until an initial event is executed in the battle mode) elapse, and therefore, there is a problem that the video game cannot proceed smoothly.

SUMMARY OF THE INVENTION

It is one object of the present invention to solve the problems described above and to provide a video game processing apparatus, a method and a computer program product for processing a video game by which the battle content in the battle scene of a RPG (video game) can be diversified (varied). Further, it is one object of the present invention to solve the problems described above and to provide a video game processing apparatus, a method and a computer program product for processing a video game that allows the video game to proceed (make progress) smoothly while maintaining realism in the battle scene of the RPG.

In order to achieve the above object, one aspect of the present invention is directed to a video game processing apparatus that causes an image display apparatus to display multiple characters of a video game, including a player character, on an image display screen (for example, an image display screen 51) of the image display apparatus (for example, a display device 50). The video game processing apparatus (for example, a video game apparatus main body 10, a video game apparatus 100) controls progress of the video game by controlling an action of each character to be displayed on the image display screen in accordance with operations by a player. The video game processing apparatus according to one embodiment of the present invention includes an action content receiver that receives an action content for the player character.

The video game processing apparatus may also include an action executing standby time identifier that identifies action executing standby time from the time when the action content receiver receives the action content to the time when the received action content becomes executable in accordance with a predetermined time identifying rule.

The video game processing apparatus may also include a timer that clocking the action executing standby time identified by the action executing standby time identifier.

The video game processing apparatus may also include an action executable range identifier that identifies an action executable range in which the player character can execute the action content received by the action content receiver in accordance with a predetermined range identifying rule.

The video game processing apparatus may also include an action target character availability determiner that determines whether or not an action target character that is a target of the action content received by the action content receiver exists within the action executable range identified by the action executable range identifier.

The video game processing apparatus may also include an action executor that executes the action content received by the action content receiver against the action target character in the case where the action target character determiner determines that the action target character exists within the action executable range when the action executing standby time is clocked by the timer.

Since the video game processing apparatus may have the configuration described above, the action content can be executed in the case where it is determined that the action target character exists within the action executable range when the action executing standby time determined in accordance with the predetermined time identifying rule elapses. Therefore, it is possible to diversify action contents of a battle scene in a RPG, for example.

It is preferable that the action executing standby time identifier identifies the action executing standby time on the basis of at least one of the action content received by the action content receiver and a predetermined action speed level in accordance with the time identifying rule. By constructing the video game processing apparatus in this manner, it is possible to determine the action executing standby time on the basis of at least one of the action content to be executed and the predetermined action speed level. This makes it possible to diversify action contents of a battle scene.

The video game processing apparatus may also include a time status display controller that causes the image display apparatus to display a time status of the action executing standby time by the timer. By constructing the video game processing apparatus in this manner, it is possible to inform the player of the degree of remaining time until the action content is executed.

The video game processing apparatus may also include a receiving interval identifier that identifies any one of action content receiving standby time from the time when the action content receiver receives the action content to the time when a next action content is allowed to be received and receiving time limit from the time when the action content receiver receives the action content to the time when receiving limit of the action content is removed. By constructing the video game processing apparatus in this manner, it is possible to prohibit receiving any another action content until the action content receiving standby time or the receiving time limit elapses.

The video game processing apparatus may also include a receiving interval timer that clocks the action content receiving standby time or the receiving time limit identified by the receiving interval identifier. The video game processing apparatus may also include a receiving interval timer status display controller that causes the image display apparatus to display a time status of the receiving interval timer. By constructing the video game processing apparatus in this manner, it is possible to inform the player of the degree of remaining time until the prohibition of the receipt of any action content is removed.

It is preferable that the timer stops clocking of the action executing standby time in the case where the action content receiver receives a new action content before the action content that has already been received by the action content receiver is not executed by the action executor yet, and that the action executing standby time identifier identifies action executing standby time until the time when the action content newly received by the action content receiver becomes executable. By constructing the video game processing apparatus in this manner, it is possible to cancel the action content once specified and to specify a new action content.

The video game processing apparatus may also include an action content memory that stores the action content received by the action content receiver in the case where the action target character determiner determines that no action target character exists within the action executable range. The video game processing apparatus may also include an action content stored display controller that causes the image display apparatus to display a notification that the action content is stored in the action content memory.

Since the video game processing apparatus may have the configuration described above, the action content can be executed in the case where it is determined that the action target character enters the action executable range. Therefore, it is possible to diversify action contents of a battle scene in a RPG, for example.

The video game processing apparatus may also include an action target character monitor that monitors whether or not the action target character that is the target of the action content enters the action executable range when the action content is stored in the action content memory. In this case, the action executor executes the action content stored in the action content memory against the action target character that is monitored to enter the action executable range by the action target character monitor. The video game processing apparatus may also include an eliminator that eliminates the action content stored in the action content memory and the notification by the action content stored display controller when the action content stored in the action content memory is executed by the action executor. By constructing the video game processing apparatus in this manner, it is possible to become a state that the action content to be next executed can be received.

It is preferable that the action content memory stores a newly received action content in the case where the action content receiver receives a new action content while the action content that has been received by the action content receiver is executed by the action executor, and that the action content stored display controller causes the image display apparatus to display a notification that the new action content is stored in the action content memory. By constructing the video game processing apparatus in this manner, it is possible to receive a next action content before the execution of the previous action content is terminated.

It is preferable that the action target character monitor monitors whether or not an action target character that is a target of the new action content exists within the action executable range in the case where the new action content has been stored in the action content memory when the execution of the action content by the action executor is terminated. In this case, it is preferable that the action executor executes the new action content stored in the action content memory against the action target character that is detected to exist within the action executable range by the action target character monitor, and that the eliminator eliminates the new action content stored in the action content memory and the notification by the action content stored display controller when the new action content stored in the action content memory is executed by the action executor. By constructing the video game processing apparatus in this manner, it is possible to execute the next action content immediately after the execution of the previous action content is terminated.

It is preferable that the action content memory updates the stored action content to the action content newly received in the case where the new action content is received by the action content receiver before the action executor executes the action content that has been received by the action content receiver. By constructing the video game processing apparatus in this manner, it is possible to change the action content once received to other action content.

It is preferable that the multiple characters include a non-player character that thwarts accomplishment of a predetermined object by the player character, and a non-player character action executable range in which the non-player character can execute an action content is defined for the non-player character in advance. In this case, the video game processing apparatus may also include a non-player character action executor that executes a predetermined action content by the non-player character against the player character on condition that the player character exists within the non-player character action executable range. By constructing the video game processing apparatus in this manner, it is possible to diversify shifting conditions to a battle scene and/or escaping conditions from a battle state. Therefore, it is possible to diversify action contents of a battle scene in a broad sense.

The video game processing apparatus may also include a character image display controller that causes the image display apparatus to display a character image in which the characters existing in a field of view of a virtual camera in a field are drawn, various actions (for example, a movement, an attack, a defense, a recovery and the like), including movement of the player character and a battle by the player character, being allowed in the field, and a same time base being applied to the multiple characters, including the player character, which exist in the field. The video game processing apparatus may also include an action content beforehand notifying image drawer that draws an action content beforehand notifying image (for example, an image indicating a target line) in the character image displayed by the character image display controller, the action content beforehand notifying image beforehand notifying the player that the action content received by the action content receiver will be executed against the action target character. The video game processing apparatus may also include an action content executing image drawer that draws an action content executing image (for example, an action executing image) in the character image displayed by the character image display controller, the action content executing image notifying the player of an executing state that the action content received by the action content receiver is executed against the action target character. By constructing the video game processing apparatus in this manner, it is possible to display a battle state in the common field in which movement and a battle are executed with a display aspect that the player can easily grasp the battle state. This allows the video game to proceed (make progress) smoothly while maintaining realism in the battle scene of the RPG.

It is preferable that the action content beforehand notifying image (for example, an image indicating a target line separated by color on the basis of the category of action content) notifies the player that the action content received by the action content receiver is a predetermined category of action content (for example, a category such as an attack, a defense, and a recover). By constructing the video game processing apparatus in this manner, the player can recognize not only an action target character but also easily and accurately recognize the category of action content. This makes it possible to easily recognize a more detailed state of the action.

It is preferable that the action content beforehand notifying image (for example, an image indicating a target line separated by color on the basis of the category of action content) is a straight line or a curved line that is in turn drawn from a vicinity of the player character to a vicinity of the action target character continuously or intermittently, and the straight line or the curved line has a predetermined display state (for example, color, line style, and the size of line), by which the player is notified of the predetermined category of action content. Since the video game processing apparatus is constructed in this manner, it is possible to easily distinguish the action target character by the straight line or the curved line that is in turn drawn from the vicinity of the player character to the vicinity of the action target character received by the action target receiver continuously or intermittently. Further, since it is possible for the player to easily distinguish the category of action content by the display state of the straight line or curved line, it is possible for the player to more easily recognize the detailed state of the action.

Further, in another aspect of the present invention, the present invention is directed to a method of processing a video game by causing an image display apparatus to display multiple characters of the video game, including a player character, on an image display screen of the image display apparatus. In this case, the method controls progress of the video game by controlling an action of each character to be displayed on the image display screen in accordance with operations by a player. The method includes receiving an action content for the player character.

The method may also include identifying action executing standby time from the time when the action content is received to the time when the received action content becomes executable in accordance with a predetermined time identifying rule.

The method may also include clocking the identified action executing standby time.

The method may also include identifying an action executable range in which the player character can execute the received action content in accordance with a predetermined range identifying rule.

The method may also include determining whether or not an action target character that is a target of the received action content exists within the identified action executable range.

The method may also include executing the received action content against the action target character in the case where it is determined that the action target character exists within the action executable range when the action executing standby time is clocked.

Moreover, still another aspect of the present invention is directed to a computer program product for processing a video game. Progress of the video game is controlled by causing an image display apparatus to display multiple characters of the video game including a player character on an image display screen of the image display apparatus, and controlling an action of each character to be displayed on the image display screen in accordance with operations by a player. The computer program product causes a computer (for example, the video game apparatus main body 10, and video game apparatus 100) to execute steps including receiving an action content for the player character.

The steps also include identifying action executing standby time from the time when the action content is received to the time when the received action content becomes executable in accordance with a predetermined time identifying rule.

The steps also include clocking the identified action executing standby time.

The steps also include identifying an action executable range in which the player character can execute the received action content in accordance with a predetermined range identifying rule.

The steps also include determining whether or not an action target character that is a target of the received action content exists within the identified action executable range.

The steps also include executing the received action content against the action target character in the case where it is determined that the action target character exists within the action executable range when the action executing standby time is clocked.

The exemplary computer program is not limited to use with a computer, but may be used, with any electronic apparatus capable of carrying out an aspect of the present invention without departing from the scope or spirit of the present invention, as those of skill in the art will readily recognize.

According to the present invention, it is possible to vary (diversify) a battle content in a battle scene of a RPG. Further, according to the present invention, movement and a battle of a player character can be executed in a common field, and a video game is allowed to proceed (make progress) smoothly while maintaining realism in the battle scene.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is a flowchart that illustrates an example of a process for determining character identifying information and the like.

FIG. 5 is an explanatory drawing that shows an example of an information table for characters existing in a field.

FIG. 7 is an explanatory drawing that shows an example of an information table for a status of the player character.

FIG. 8 is an explanatory drawing that shows an example of an information table for weapons.

FIG. 10 is an explanatory drawing that shows an example of a display state of a target line drawn from a player character (an attacking entity) to an enemy character (an attack target).

FIG. 11 is an explanatory drawing that shows an example of action types distinguished by the color of a target line.

DETAILED DESCRIPTION OF THE INVENTION

Preferred embodiments of a video game processing apparatus, a method and a computer program product for processing a video game according to the present invention will be described in detail with reference to the appending drawings.

Figure 1:
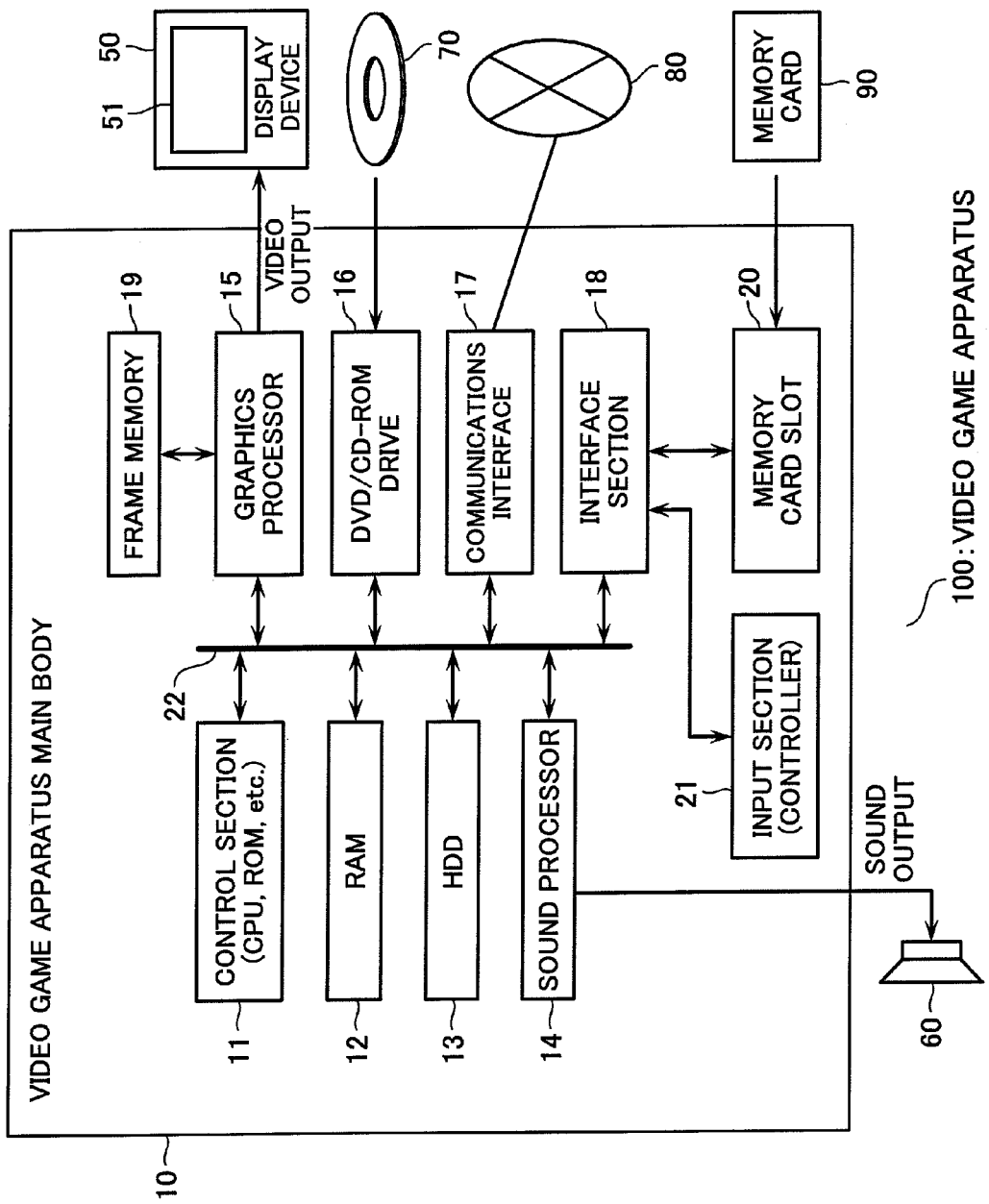
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input section (controller) 21.

Each of the control section 11, the RAM (Random-Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like, and executes control of the whole video game apparatus 100 in accordance with control programs stored in the HDD 13 and/or a storage medium 70. The control section 11 includes an internal timer used to generate timer interruption. The RAM 12 may be used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to $\frac{1}{30}$ seconds per frame (for NTSC type displays), for example. However, the switching time may be any other frame rate (for example, $\frac{1}{25}$ second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input section 21 and the memory card slot 20 is connected to the interface section 18. The interface section 18 causes the RAM 12 to store instruction data from the input section 21 on the basis of operation(s) of the input section 21 by a player of the video game apparatus 100. In response to the instruction data stored in the RAM 12, the control section 11 executes various arithmetic processing.

The input section 21 is constituted from, for example, a controller for a video game apparatus 100, and includes multiple operational buttons (operational keys) such as a directional instruction key and various selection keys. In the present embodiment, when a player (that is, a user of the video game apparatus 100) operates the directional instruction key, a player character (to be described later) is virtually moved. Further, operation of the various selection keys by the player causes the control section 11 to generate various commands such as a battle command and to execute a predetermined process according to the scene displayed on the image display screen 51. In this regard, the directional instruction key is used to move a cursor and the like.

Further, the interface section 18 executes, according to command(s) from the control section 11, a process to store data indicative of the progress of a video game stored in the RAM 12 into the memory card 90 installed in the memory card slot 20. The interface section 18 also executes a process to read out data on the video game stored in the memory card 90 at the time of suspending the video game and to transfer such data to the RAM 12, and the like.

Various data, such as control program data for executing the video game with the video game apparatus 100, are stored in, for example, the storage medium 70. The various data, such as the control program data stored in the storage medium 70, are read out by the DVD/CD-ROM drive 16 in which the storage medium 70 is installed, and the data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used for a work memory while the control section 11 executes processing.

It is assumed that a three-dimensional video game according to an aspect of the present embodiment is a video game wherein multiple characters, including a player character (that is, a character that moves in accordance with the operation of the input section 21 by the player, which will be described later), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation, it is assumed that only a single player character P and multiple non-player characters (which are not moved in response to operation of the player, but are moved in accordance with control of the video game apparatus 100 (more specifically, control of the control section 11), and hereinafter, referred to simply as "NPC") exist as objects that are movable in the virtual three-dimensional space. Explanations for any process other than the processes relating to the present invention are omitted, in particular. In this regard, in the present embodiment, video game control for a RPG is executed.

Figure 2:
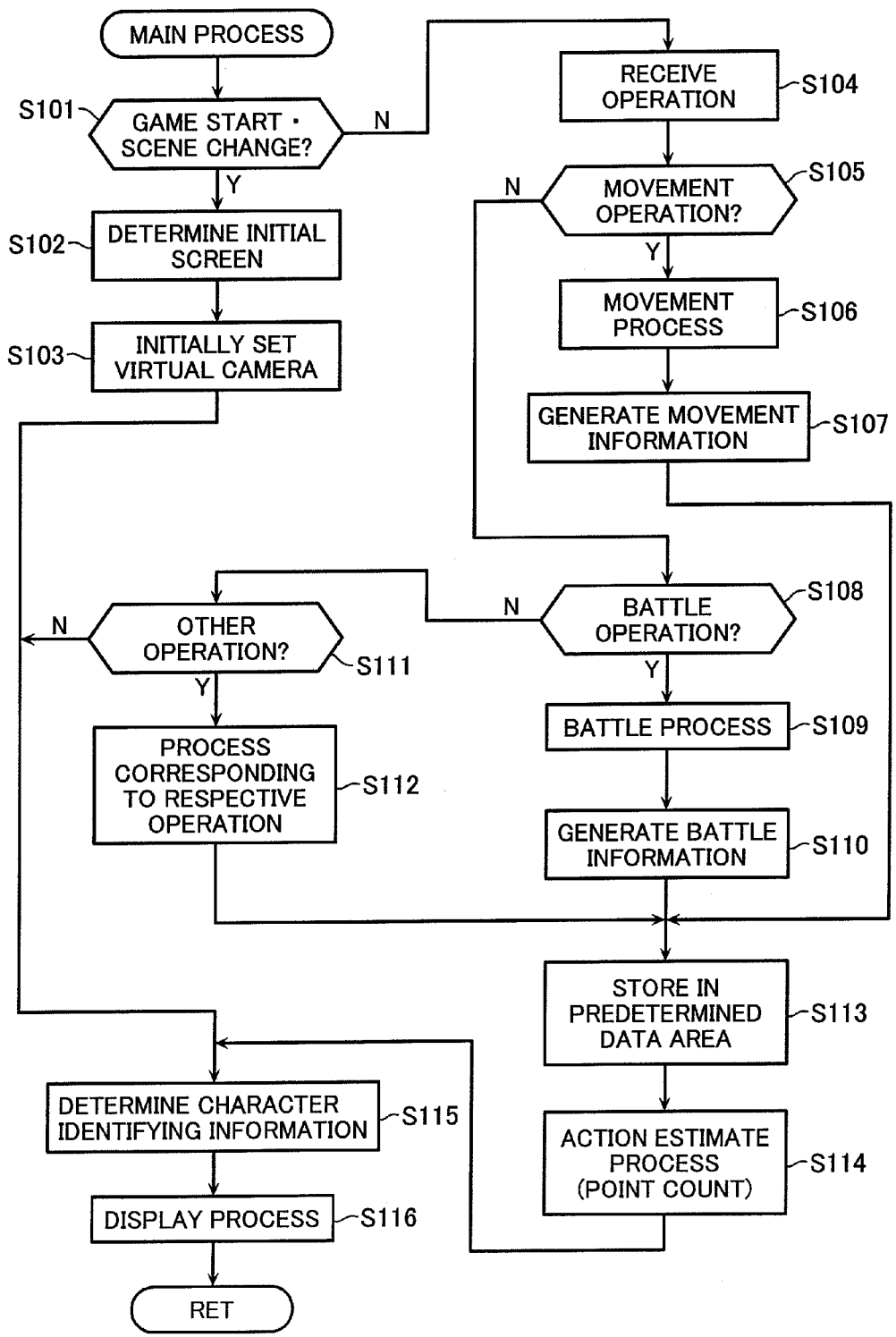
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game, and is executed in accordance with timer interruption at every $\frac{1}{30}$ second. However, it is to be noted that timing of "at every $\frac{1}{30}$ second" is only one example, as mentioned before. For example, the main process may be executed in accordance with timer interruption at every single field period (every $\frac{1}{60}$ second) or at every two frame periods (every $\frac{1}{15}$ second), or any other appropriate field rate that may be recognized by those skilled in the art to be appropriate without departing from the scope or spirit of the present invention.

In the present embodiment, a video game (that is, a RPG game) proceeds in a common field in which various actions, including movement of the player character and a battle by the player character, are allowed. In the case where a predetermined object in the field is accomplished, one stage may be terminated and the processing may proceed to another stage executed in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the input section 21 by the player or not in the case where the state is still before the video game start. Alternatively, once the video game is in an execution state, the control section 11 determines whether a timing state is reached to change the scene (for example, change the field) (Step S101). The timing state to change the scene is, for example, the time at which a virtual three-dimensional space, illustrating a new scene, is displayed on the image display screen 51 in order to finish the scene that has been displayed on the image display screen 51 until that point (for example, a scene displayed by a virtual three-dimensional space, and a scene displayed by a directorial moving image) and to switch the displayed scene to the new scene.

In the case where it is determined that an instruction to start a video game is generated, or that the timing state reaches a state to change the scene ("Yes" at Step S101), the control section 11 determines an initial screen (an initial screen shown at the time of start of the video game, or an initial screen shown at the time of change in the scene) in accordance with the control program (Step S102). In this case, various data, such as image data used for the video game and characters, are stored in the storage medium 70. At Step S102, an initial display position of the player character in an initial screen or a scene after a scene change (for example, a new stage), a NPC or NPCs to be displayed, an initial display position of each of the NPCs to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed and it is not time to change the scene ("No" at Step S101), the control section 11 receives instruction data in accordance with the operation of the input section 21 by the player (Step S104). Namely, the control section 11 determines whether instruction data for executing movement of a player character or the like is inputted from the input section 21. In the case where effective instruction data (that is, it means that such effective instruction data is instruction data that is allowed to be received by the control section 11) is inputted, the control section 11 receives the effective instruction data.

In the case where the control section 11 receives instruction data for instructing an action of the player character relating to the movement of the player character (that is, movement instruction data: movement instruction by a movement command or the directional instruction key) in accordance with the operation of the input section 21 by the player relating to the movement of the player character (movement operation) at Step S104 ("Yes" at Step S105), the control section 11 executes a movement process in accordance with the movement instruction data thus received (Step S106). In the movement process, the control section 11 causes the position of the player character to move in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, and data on the size of a visual angle. The control section 11 then changes the setting content of the virtual camera. The movement information includes various kinds of information on the movement such as the viewpoint position of the virtual camera, the direction of the visual axis, and the size of the visual angle changed along with the position of the player character after the movement, as well as information on the movement of the player character. Then, the processing flow proceeds to Step S113.

In the case where the control section 11 receives instruction data for instructing an action regarding a battle (that is, battle instruction data: a battle command) in accordance with an operation of the input section 21 by the player for instructing the action of the player character regarding the battle (battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information among the name of the player character that battles an enemy character, the name of the enemy character, battle development, battle result thereof, a parameter (or parameters) that defines the ability (or abilities) of the player character, and the like. The battle information includes various kinds of information on the battle such as the name of the player character that battles an enemy character, the name of the enemy character, battle development, battle result thereof, and a parameter that defines the ability of the player character. Then, the processing flow proceeds to Step S113.

In the case where the control section 11 receives instruction data for other instruction (that is, other instruction data: a command other than the movement or battle command) in accordance with the operation of the input section 21 by the player for executing other instruction (other operation) at Step S104 ("No" at Step S105, "No" at Step S108 and "Yes" at Step S111), the control section 11 executes a process (for example, conversation, purchase, pick up an object, or the like) in accordance with the other instruction data thus received (Step S112). Other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of information indicating the action histories of the player character once stored in the RAM 12 (Step S114). More specifically, information required to be digitized is digitized using conversion tables prepared in advance, and with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area, by which the score is updated as estimate information.

Further, the control section 11 executes determination of a display state of character identifying information for identifying each of the characters displayed in the character image of the image display screen 51 (Step S115). The processing at Step S115 will be described in detail.

Then, the control section 11 perspectively transforms the virtual three-dimensional space, including the player character P and the NPCs to be displayed from the virtual camera, onto the virtual screen in accordance with setting content of the virtual camera and/or the content determined at Step S115. The control section 11 executes a display process to generate a two-dimensional image to be displayed on the image display screen 51 (Step S116). When the display process is terminated, this main process is terminated. Then, when timer interruption is generated at the time of a start of a next frame period, a next main process is executed (that is, the main process is repeated). By repeatedly executing the main process, a character image is switched every frame period, and a moving image (animation) is displayed on the image display screen 51.

Now, the display process at Step S116 will be described. At Step S116, the control section 11 first transforms at least the coordinates of the vertexes of respective polygons included within a range to be perspectively transformed on the virtual screen among the coordinates of the vertexes of polygons constituting the virtual three-dimensional space in which the player character P and the three-dimensional NPCs are included from the coordinates of the world coordinate system to the coordinates of the viewpoint coordinate system. Subsequently, the control section 11 transmits the coordinates of the vertexes of polygons of the player character P and the NPCs in the viewpoint coordinate system to the graphics processor 15, thereby outputting a drawing or graphics command to the graphics processor 15.

When the drawing or graphics command is input to the graphics processor 15, the graphics processor 15 updates, on the basis of the coordinates of the viewpoint coordinate system, the content of the Z buffer so that data on the points that reside at the front side are retained with respect to points constituting each surface. When the content of the Z buffer is updated, the graphics processor 15 develops image data on the points that reside at the front side on the frame memory 19. Further, the graphics processor 15 develops image data indicating the character identifying information by the display state determined at Step S115 on a corresponding position of the frame memory 19. Moreover, the graphics processor 15 executes some processes such as a shading process and a texture mapping process, for example, with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals output from the graphics processor 15 on the image display screen 51. By switching images displayed on the image display screen 51 every single frame period, the player can see images including the state in which the player character and/or the NPCs are moved on the field and perceive the images as moving images.

Figure 3:
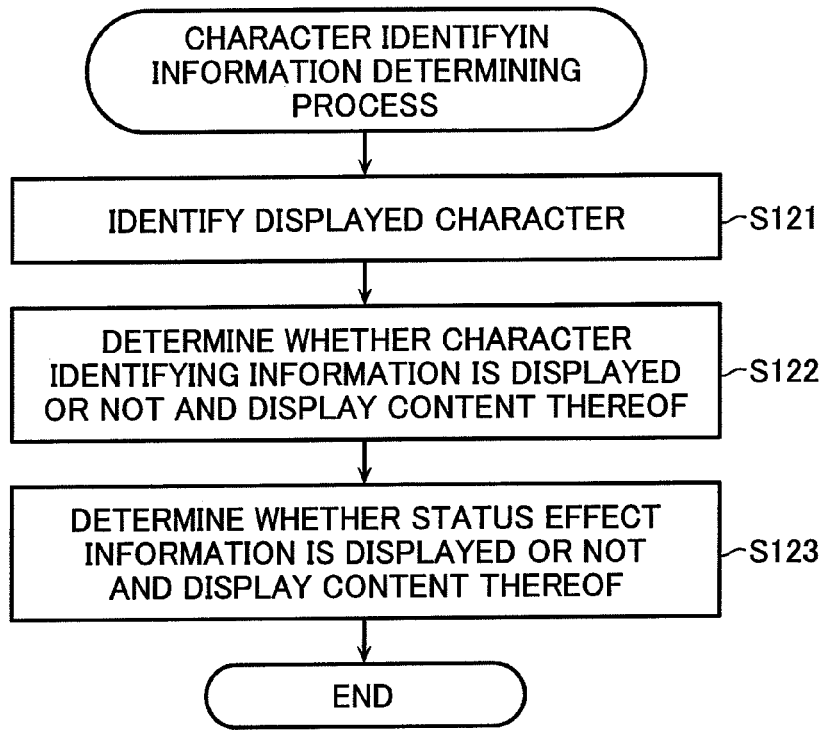
Figure 4:
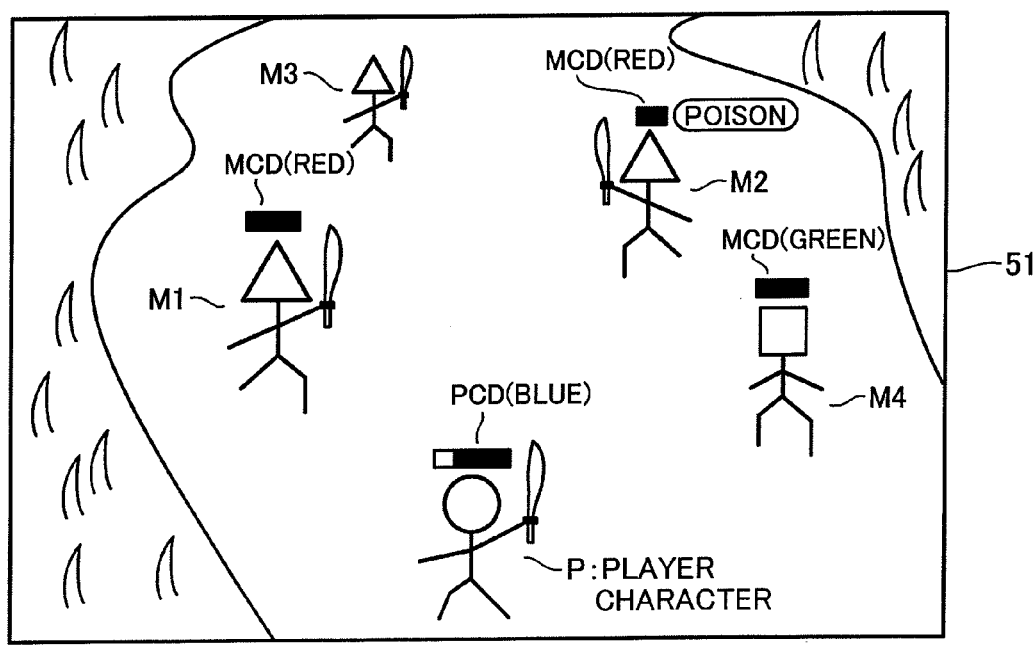
FIG. 4 is an explanatory drawing that shows an example of a character image displayed on an image display screen.

Next, a character identifying information determining process (Step S116) that may be executed on the video game apparatus 100 according to an aspect of the present embodiment will be described. FIG. 3 is a flowchart that illustrates an example of a process for determining character identifying information and the like in the video game apparatus 100 according to an aspect of the present embodiment. FIG. 4 is an explanatory drawing that shows an example of a character image displayed on the image display screen 51 in the video game according to an aspect of the present embodiment. An example of the character image in which a character identifying image indicating the character identifying information is displayed, is illustrated in FIG. 4.

A player character P and multiple non-player characters M1 to M4 are displayed in the character image illustrated in FIG. 4. In order to simplify the illustration in FIG. 4, the player character P is shown by a character whose head is a circular shape. Also, each of the enemy characters among the non-player characters is shown by a character whose head is an inverted triangle shape, and each of the neutral characters among the non-player characters M1 to M4 is shown by a character whose head is a tetragon shape. The player character P and the respective non-player characters M1 to M4 are actually shown as characters that imitate a human and/or an animal, for example, and characters formed as objects such as a vehicle. However, those skilled in the art will recognize that any manifestable object, sound, smell, or taste may be a character without departing from the scope or spirit of the present invention.

Each part forming the player character P or each of the non-player characters M1 to M4 is constituted from, for example, multiple polygons, and the characteristic points (vertexes of the respective polygons) are indicated by coordinates of the local coordinate system. Namely, in an aspect of the present embodiment, the player character P or each of the non-player characters M1 to M4 is a three-dimensional character drawn by three-dimensional polygon data. In this regard, the player character P or each of the non-player characters M1 to M4 may be a two-dimensional character drawn by two-dimensional sprite data.

As illustrated in FIG. 4, the player character P is shown at a lower portion of the central position on the image display screen 51 in an aspect of the present embodiment. In this case, the player character P may be movable within a predetermined range of the lower portion of the central position on the image display screen 51. In the present embodiment, the player character P is constituted so as not to be movable to an upper side from a predetermined position of the lower portion of the central position on the image display screen 51. The positions of the respective vertexes of each polygon constituting the player character P are defined by identifying the positional relationship of each of the characteristic points by the local coordinate system, and transferring the coordinates of the characteristic points to the coordinates of the world coordinate system.

The non-player characters M1 to M3 among the multiple non-player characters shown in FIG. 4 are enemy characters each of which prevents action, or the like, of the player character P. Even though the player character P may not attack such an enemy character M1 to M3, each of them, however, may attack the player character P. On the other hand, the non-player character M4 is a neutral character that does not affect an action and the like of the player character P in principle. The non-player character M4 does not attack the player character P so long as the player character P does not attack the non-player character M4.

Each of the non-player characters is movable in accordance with the progress of the video game in response to the control program. Namely, even when the player character P is not moved, one or more non-player character may be moved in the character image in response to the control program.

Further, each of the non-player characters may newly appear on a character image from the outside of the character image (that is, outside the image screen), disappear from the character image, and be moved to the outside of the image display range. Moreover, each of the non-player characters may have the same shape as each other. Alternatively, a part, or all, of the non-player characters may have different shapes, respectively.

The image in which the player character P and/or the multiple non-player characters M1 to M4 are movable on the field in the virtual three-dimensional space is displayed on the image display screen 51 by perspective-transforming the virtual three-dimensional space by means of the virtual camera, whereby the player of the video game recognizes such an image. The image projected on a virtual screen from the virtual camera positioned in the virtual three-dimensional space becomes the image displayed on the image display screen 51. A viewpoint coordinate system may be used to project an image on the virtual screen. For this reason, the coordinates of the world coordinate system are to be transformed to the coordinates of the viewpoint coordinate system by the control section 11.

In the case where an image projected on the virtual screen is generated by means of a perspective transformation, there is a need to carry out hidden surface removal that removes a surface of the object hidden by another object placed in the front thereof. In the present embodiment, a Z buffer method is used as the hidden surface removal method. Namely, when the control section 11 transforms the coordinates of the world coordinate system to the coordinates of the viewpoint coordinate system, the control section 11 informs the graphics processor 15 of the coordinates of the respective characteristic points and outputs the drawing or graphics command thereto. On the basis of this drawing or graphics command, the graphics processor 15 updates the content of the Z buffer so that data on the points that reside at the front side are retained with respect to the respective characteristic points, and develop the image data on the characteristic points on the frame memory 19 for every update.

In the character identifying information determining process, the control section 11 first identifies the characters displayed on the image display screen 51 on the basis of current position information of each character updated and stored in the predetermined data area of the RAM 12 at Step S113 (Step S121). In an aspect of the present embodiment, the current position information of each character is set in an information table for characters existing in a field (to be described later), and each character displayed in the character image is identified by confirming the current position information of the character set in the information table for characters existing in a field.

The information table for characters existing in a field is a table provided in every field that is used in the video game, and setting data are appropriately updated in accordance with the progress of the video game (which are updated at Step S113 in the present embodiment).

For example, as shown in FIG. 5, character information on each character existing in the corresponding field is set in the information table for characters existing in a field. More specifically, as shown in FIG. 5, the character information includes various kinds of information such as a name of each character, a maximum HP of each character and a current remaining HP of the character, a maximum MP (Magic Point) and a current remaining MP of the character, the current position of the character, information on whether or not the character is a character that the player character P can specify as an action target, a property or properties of the character (such as a characteristic property), and a status effect affecting the character.

Here, a character "A" (which is the player character P), a character "D", a character "E", a character "F" and a character "G" are identified at Step S121. In this regard, in the example shown in FIG. 5, although there are characters each having a property of "friend" in addition to the player character P, they are omitted in order to simplify the explanation.

Subsequently, the control section 11 determines, with respect to each of the characters identified at Step S121, the presence or absence of the display of character identifying information and a display content thereof on the basis of the information table for characters existing in a field (Step S122).

In the present embodiment, the control section 11 determines that characters that may be an action target of the player character P are to be displayed. Namely, it is determined that character identifying information of each of characters positioned within a predetermined distance from the player character P, where the player character P can specify them for action targets thereof among the enemy characters, are displayed and character identifying information of each of the other characters positioned outside the predetermined distance from the player character P, where the player character P cannot specify them for action targets thereof among the enemy characters are not displayed. More specifically, by referring to the column "Availability of Action Target" in the information table for characters existing in a field, characters for which "Available" is inserted in the column are determined as characters whose character identifying information is to be displayed. Each of the rows in the column "Availability of Action Target" is updated in accordance with the distance between the player character P and each of the characters at Step S113.

Further, with respect to the characters whose character identifying information is determined to be displayed, the display content of the character identifying information is determined in accordance with the maximum HP, the current remaining HP and the property of each of the characters. In the present embodiment, a display color of the character identifying information is determined in accordance with the property of the corresponding character. The degree of filling of a physical strength gauge of the character in the character identifying information for indicating the remaining rate of the HP thereof is determined in accordance with the maximum HP and the current remaining HP of the character.

In this case, among the character "A", the character "D", the character "E", the character "F" and the character "G" identified at Step S121, it is determined at Step S122 that the character identifying information of the character "F" whose "Available of Action Target" is "no available" is not to be displayed. It is also determined that the character identifying information of each of the characters D, E and G whose "Available of Action Target" is "available" may be displayed. In this regard, it is determined that the character identifying information of the character "A" that is the player character P is always displayed.

It is determined that with respect to the character "A" the character identifying information is displayed by the physical strength gauge filled with blue, including a degree of filling that corresponds to the rate of the HPs because the property of the character "A" is "friend" and the rate of the HPs thereof is 200/350. Further, it is determined that with respect to the characters D and E, for example, the character identifying information of each of the characters D and E is displayed by a physical strength gauge wholly filled with red because the property of each of the characters D and E is "enemy" and the rate of the HPs thereof is 80/80. Moreover, it is determined that with respect to the character "G", for example, the character identifying information thereof is displayed by a physical strength gauge wholly filled with green because the property of the character "G" is "neutral" and the rate of the HPs thereof is 100/100.

Subsequently, when the character identifying information is displayed, the control section 11 further determines whether status effect information is displayed or not and a display content thereof in the case where the status effect information is to be displayed (Step S123).

In an aspect of the present embodiment, it is determined that the status effect information indicating the status effect of the character is displayed with respect to the character that is affected by the status effect. More specifically, by referring to the column "STATUS EFFECT" in the information table for the characters existing in a field with respect to the characters whose character identifying information is determined to be displayed, it is determined that the status effect information with respect to the character is displayed in the case where any status effect is set for the character. Each of the rows in the column "STATUS EFFECT" is updated in accordance with, for example, the battle information at Step S113. In this regard, in the case where there are multiple status effects that affect the character, the status effect information indicating a part of the multiple status effects may be displayed. The status effect information indicating all the multiple status effects may be displayed separately or collectively.

In this case, since only the character "E" is affected by the status effect, it is determined that only the status effect information of the character "E" is displayed, and that, for example, a figure (status effect image) that is a status effect indicating "poison" is displayed as the status effect information.

As described above, by determining the presence or absence of the display of the character identifying information and the display content thereof, and the presence or absence of the display of the status effect information and the display content thereof, the character image as shown in FIG. 4, for example, is finally displayed through the process at Step S116.

Namely, as shown in FIG. 4, a character identifying image PCD indicating the character identifying information is displayed above the head of the character "A" (player character P). The character identifying image PCD shows that the property of the character "A" is "friend" by the display color (blue), and indicates the remaining ratio of the HP by the degree of filling of a physical strength gauge thereof. Further, a character identifying image MCD indicating the character identifying information is displayed above the head of each of the character "D" (enemy character M1) and the character "E" (enemy character M2). This character identifying image MCD shows that the property of each of the characters D and E is "enemy" by the display color (red), and indicates the remaining ratio of the HP by the degree of filling of a physical strength gauge thereof. Moreover, a character identifying image MCD indicating the character identifying information is displayed above the head of the character "G" (enemy character M4). This character identifying image MCD shows that the property of the character "G" is "neutral" by the display color (green), and indicates the remaining ratio of the HP by the degree of filling of a physical strength gauge thereof. In this regard, since the character "F" (enemy character M3) is a character that the character "A" (player character P) cannot specify as an action target, character identifying information is not displayed above the head of the character "F". Further, the display position of the character display information is not limited to the position above the corresponding character, but may be located in any other position, so long as the display position is in the vicinity of the corresponding character. Moreover, the display state of the character display information may be another state other than "POISON".

Further, as shown in FIG. 4, the status effect image indicating the status effect information (an image indicating that the corresponding character is affected by poison) is displayed at the side of the character identifying image MCD displayed above the head of the character "E" (enemy character M2). In this regard, the display position of the status effect image is not limited to the side of the character identifying image, but may be located in any other position so long as the display position is in the vicinity of the character identifying image. Moreover, the display state of the status effect image may be other state, or plural states, other than the example of "POISON" used here for illustrative purposes.

Figure 6:
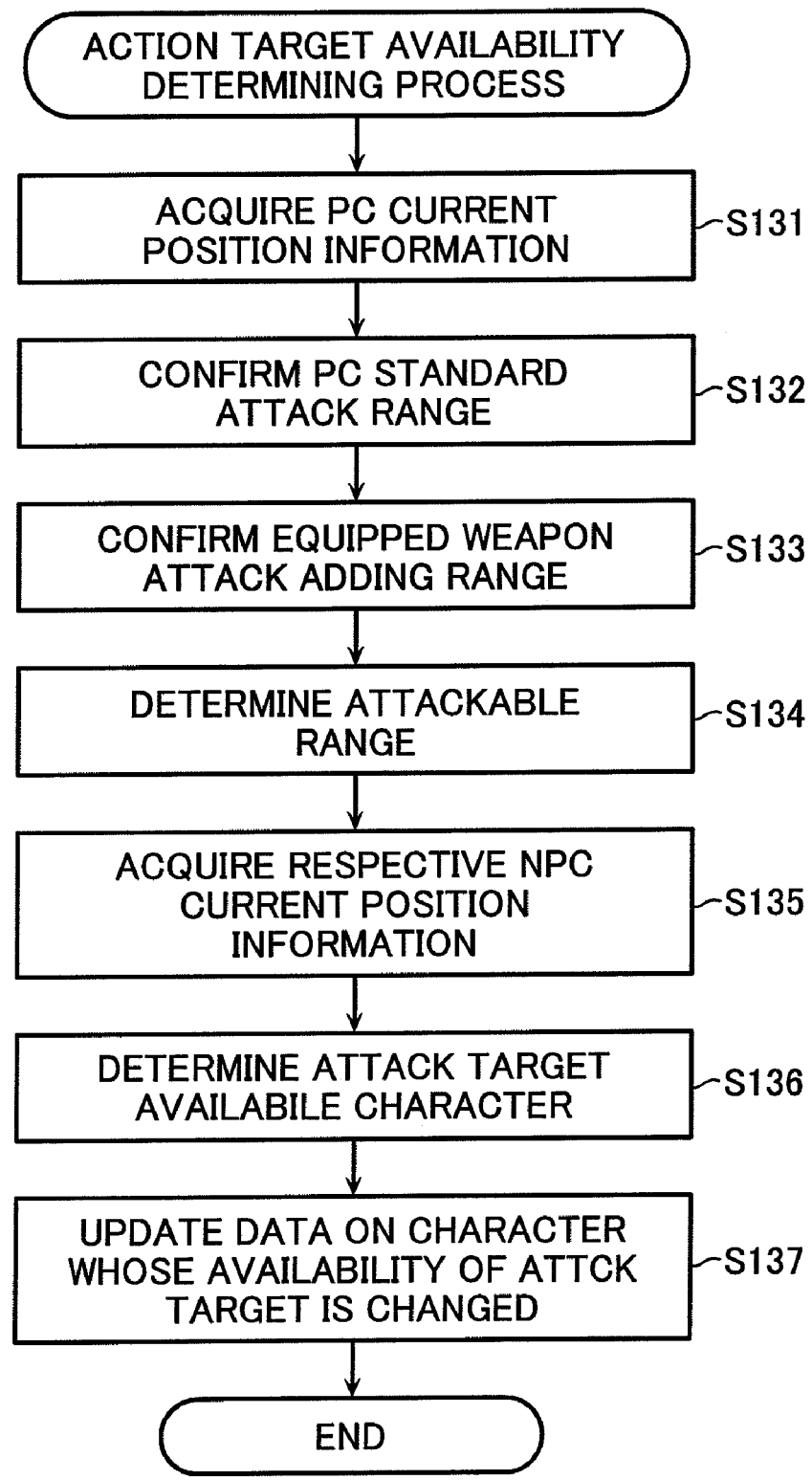
FIG. 6 is a flowchart that illustrates an example of an action target availability determining process.

Next, an action target availability determining process in the video game apparatus 100 according to an aspect of the present embodiment will be described. FIG. 6 is a flowchart that illustrates an example of an action target availability determining process in the video game apparatus 100 according to an aspect of the present embodiment. The action target availability determining process shown in FIG. 6 is achieved by executing the main process as described above repeatedly.

The action target availability determining process is a process to determine the content of "action target availability" in the information table for characters existing in the field as described above, and to set and update the content. In this case, a process to determine and update the content of "availability of action target" of characters other than the player character and friends characters (that is, enemy characters and neutral characters) will be described. Further, in particular, the case where determination of availability of an attack target in which the player character can execute an action with a weapon with which the player character is equipped is executed will be explained.

In the action target availability determining process, the control section 11 first acquires current position information of the player character (Step S131). Subsequently, the control section 11 confirms a standard attack range of the player character (hereinafter, referred to simply as a "PC standard attack range") (Step S132). The confirmation of the standard attack range of the player character is executed by, for example, confirming a standard attack range set in a player character status information table as shown in FIG. 7.

The player character status information table is a table in which various status information indicating a current status of the player character is set. Here, as shown in FIG. 7, a maximum HP, a current HP, a maximum MP, a current MP, a level in the video game (LV), a weapon equipped by the player character, a standard attack range, a standard standby time, and the like of the player character are set in the player character status information table as status information. In this regard, although it is not shown in FIG. 7, respective ranges where an action other than an attack, such as a defense, can be executed may be set in the player character status information table.

The "standard attack range" is a range that is a standard of a region where the player character can attack. In the example shown in FIG. 7, a region within 5 meters forward from the player character and within 3 meters in width at each side of the player character (total 6 meters) is set as the "standard attack range". In this regard, the shape of the region indicating the standard attack range is not limited to the rectangular shape, but it may be any shape. Further, the region may be set in a predetermined region apart from the player character. Moreover, the standard attack range may be set any of backward, right and left of, and above and under the player character.

The "standard attack range" is a range defined by, for example, the level of the player character in the video game, the degree of difficulty of the video game that can be set by the player, or the like. Namely, for example, when the level in the video game is increased, the standard attack range may be set so as to become wider. In the case where the degree of difficulty of the video game is set to a higher degree, the standard attack range may be set so as to become narrower. In this regard, the "standard attack range" may be a fixed range.

The "standard standby time" is a range that is a standard of the standby time until a predetermined action becomes executable after the execution of the predetermined action is specified by the player. In the example shown in FIG. 7, time measurement is started after the execution of the predetermined action is specified by the player. When 6 seconds elapses after the time measurement, the specified action becomes executable.

The "standard standby time" is a time period defined by, for example, the level of the player character in the video game, the degree of difficulty of the video game that can be set by the player, or the like. Namely, for example, when the level in the video game is increased, the standard standby time may be set so as to become shorter. In the case where the degree of difficulty of the video game is set to a higher degree, the standard standby time may be set so as to become longer. In this regard, the "standard standby time" may be a fixed time period.

Next, the control section 11 confirms an attack adding range defined for each of weapons with which the player character is equipped (Step S133). In this case, the control section 11 confirms the attack adding range defined for each of the weapons by, for example, referring to a weapon information table shown in FIG. 8.

Information on various weapons with which the player character and the like can be equipped is set in the weapon information table. For example, as shown in FIG. 8, information such as a name of the weapon, offensive power of the weapon, an attack adding range and the like corresponds to the weapon, and the information is set in the weapon information table.

Subsequently, the control section 11 determines an attackable range of the player character using the current position information of the player character acquired at Step S131, the PC standard attack range confirmed at Step S132, and the attack adding ranges of the equipped weapons confirmed at Step S133 (Step S134). More specifically, on the basis of the position indicated by the current position information, a region obtained by adding the attack adding range to the PC standard attack range is determined as the attackable range of the player character. In this regard, any one of the PC standard attack range and the attack adding range may be used as a factor to determine the attackable range. Alternatively, other factor than the PC standard attack range and the attack adding range may be used.

The control section 11 then acquires the current position information of the respective non-player characters (Step S135). The control section 11 determines whether or not each of the non-player characters is a character that the player character can identify as an attack target by confirming whether or not each of the non-player characters is included in the attackable range (Step S136). Data on the "availability of action target" in the information table for characters existing in a field are then updated with respect to characters whose availability of action target is changed by the determined result (Step S137).

Figure 9:
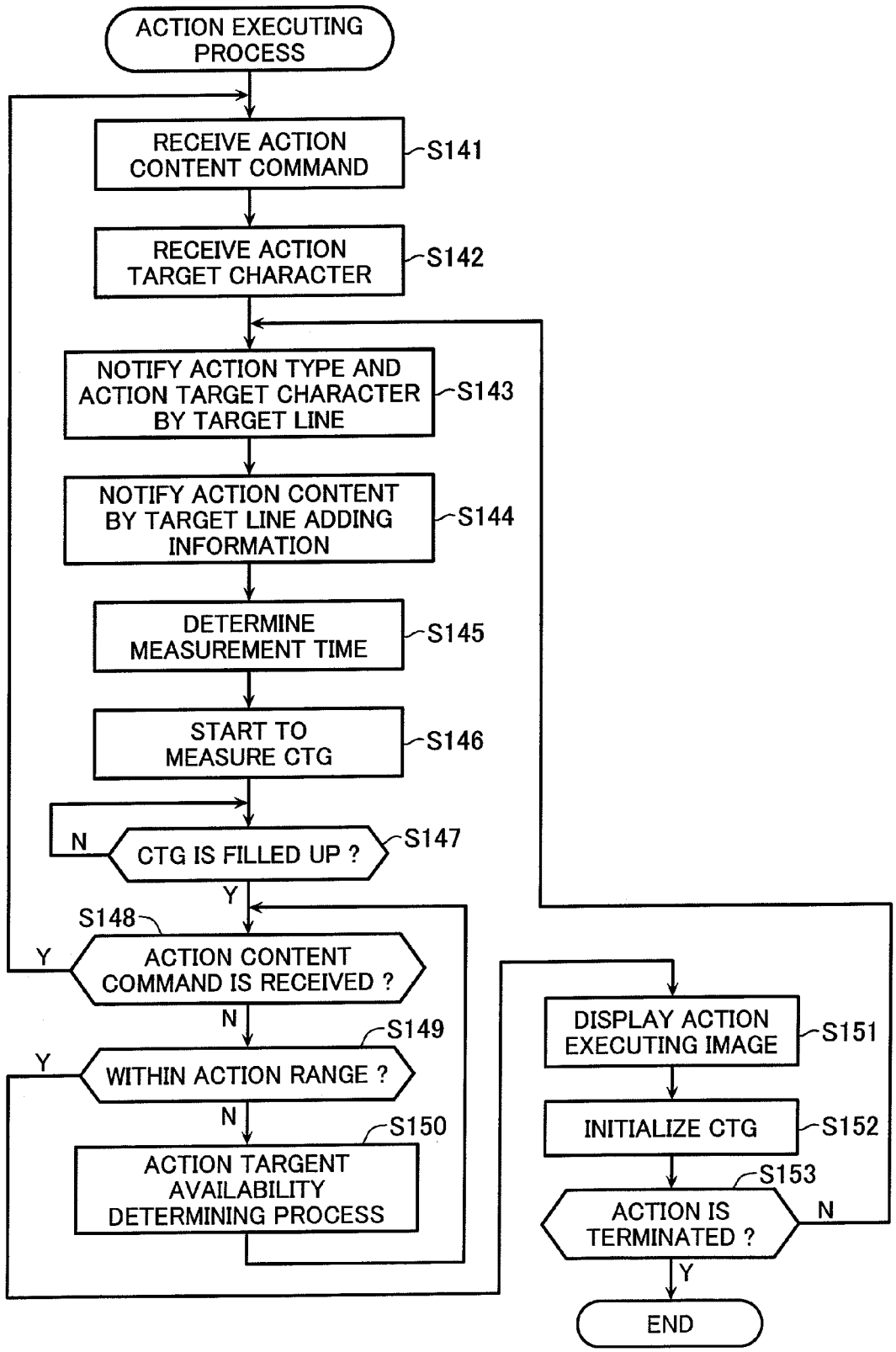
FIG. 9 is a flowchart that illustrates an example of an action executing process.

Next, an action executing process in the video game apparatus 100 according to an aspect of the present embodiment will be described. FIG. 9 is a flowchart that illustrates an example of the action executing process in the video game apparatus 100. The action executing process shown in FIG. 9 is achieved by executing the main process as described above repeatedly.

In the action executing process, the control section 11 first receives an action content command (Step S141). The action content command may include, for example, a movement command, a battle command, and/or other command. Here, for example, a battle command is received at Step S141. The battle command is a command specifying the kind of action (for example, an attack, a defense, a recovery and the like) and the content of the action (for example, an attack with a sword, a defense with a shield, a recovery by medicine). In this regard, the process at Step S141 corresponds to that at Step S104 in the main process.

When the control section 11 receives, for example, the action content command, the control section 11 also receives an attack target character (Step S142) because the received action content command is a battle command that requires a player to specify an action target. In this case, the action target character is specified by the battle command. In this regard, the process at Step S142 corresponds to that at Step 104 in the main process.

When the action content command and the action target character are received, the control section 11 and the graphics processor 15 execute the control process to display a target line for beforehand notifying the player of a category or kind of action in the action content specified by the action content command and a character that the player character P specifies as the action target (Step S143). In this regard, the process at Step S143 corresponds to that at Steps S109 to S114 and S116 in the main process.

The target line TL is displayed by the process at Step S143 as shown in FIG. 10, for example. In FIG. 10, the target line TL is displayed when the action content of "attack with a sword", for example, is specified by the action content command and the enemy character M1 is specified as the action target as shown. In this way, by viewing an image in which a line (target line TL) is in turn drawn from the player character P (an attacking entity) to the enemy character M1 (an attack target) continuously or intermittently, a player of the video game can recognize the action entity and the action target immediately.

In an aspect of the present embodiment, as shown in FIG. 11, whether an action that will be executed from now is "attack", "supplemental attack", or "recover" can be recognized by the color of the displayed target line TL. Thus, by viewing an image in which the target line TL is drawn, the player can immediately recognize the category or kind of action that will be executed in addition to the action entity and the action target. In this regard, the category or kind of action may be distinguished by different line styles or line widths without using the colors of the target line TL. Furthermore, for more complex commands, any combination of colors, styles and/or widths may be used as will be readily recognized by those skilled in the art without departing from the scope or spirit of the present invention.

In this regard, the target line TL is not limited to the curved line as shown in FIG. 10, but it may be other type of lines (line styles) such as a straight line and/or a wavy line.

Further, the control section 11 and the graphics processor 15 execute the control process to display target line adding information for notifying the player of the action content specified by the action content command (Step S144). In this regard, the process at Step S144 corresponds to that at Steps S109 to S114 and S116 in the main process.

The target line adding information AD, for example, is displayed along with the target line TL by the process at Step S144 as shown in FIG. 10, for example. In FIG. 10, the action content of "attack with a sword" is specified by the action content command, and the target line adding information AD is shown along with the target line TL that is displayed, for example, when the enemy character M1 is specified as the action target. The target line adding information AD is shown as an image illustrating "attack with a sword", which is the action content specified by the action content command. In an aspect of the present embodiment, as shown in FIG. 10, an image of a sword is displayed along with the target line TL as the target line adding information AD. In this way, by viewing an image in which a line (target line TL) is drawn from the player character P (an attacking entity) to the enemy character M1 (an attack target) and the target line adding information AD is displayed along with the target line TL, the player of the video game can immediately recognize the action content in addition to the action entity and the action target. However, the display position and the display state of the target line adding information are not limited the example illustrated in FIG. 10, but may be manifested in any other position, form, or color, or any combination thereof, as will be readily appreciated by those skilled in the art, without departing from the scope or spirit of the present invention.

When the target line TL and the target line adding information AD are displayed, the control section 11 determines time to be measured using a CTG (Charge Time Gauge: a gauge for measuring time until an action can be executed, that is, action execution standby time, or measurement time) (Step S145). In an aspect of the present embodiment, at Step S145, the control section 11 confirms standard standby time set in the player character status information table (see FIG. 7), and determines the measurement time on the basis of the standard standby time. The measurement time may be set to the standard standby time, or to time obtained by adding or subtracting a predetermined time period to or from the standard standby time. More specifically, the predetermined time period may be a time period specified by a weapon with which the player character is equipped or a time period specified by the degree of difficulty of the video game set by the player. Such a time period may be added to or subtracted from the standard standby time. In this regard, in the case where the attack is executed using magic, a time period specified by a kind of the magic may be added to or subtracted from the standard standby time.

When the measurement time is determined, the control section 11 and the graphics processor 15 start to measure the measurement time determined at Step S145 using the CTG (Step S146). When a scale of the CTG is filled up (Step S147), the control section 11 causes the display device 50 to display, for example, "Action" in the vicinity of the CTG (not shown in the drawings) indicating that an attack can be executed.

Subsequently, the control section 11 and the graphics processor 15 monitor whether or not the received action target character is within an action range (Step S149). In the case where the action target character is positioned within the action range, the control section 11 and the graphics processor 15 eliminate the indication "Action" indicating that the character can be attacked, and execute the control process to display an action executing image in which the action specified by the action content command is executed against the action target character thus received (Step S151). For example, an image indicating a state that the player character P attacks the enemy character M1 with a sword may be displayed as the action executing image. In the case where an action content command is newly received while executing the action specified by the action content command previously received, the control section 11 causes the display device 50 to display an indication (for example, "NEXT") indicating that an action content specified by the action content command newly received is reserved until the executing action content is terminated. The control section 11 stores the action content specified by the action content command newly received and an action target character thereafter received in, for example, a predetermined data area of the RAM 12 as newly reserved information. In this regard, the CTG is also referred to as a wait time gauge (WTG) or an active time gauge (ATG).

In this case, at Step S149, the control section 11 confirms whether the "availability of action target" of the corresponding character in the information table for characters existing in the field is "available" or not. In the case where the control section 11 confirms at Step S149 that the character is positioned outside the action range, the control section 11 executes the action target availability determining process (see FIG. 6) while keeping the indication (for example, "Action") indicating that the character can be attacked. The control section 11 then determines whether an action content command is newly received or not. The processing flow returns to Step S149 in the case where the control section 11 determines that any action content command is not newly received. In the case where an action content command is newly received before the action content previously received is not executed while the scale of the CTG is filled up, the control section 11 eliminates the received action content and the reserved information on the action target character, and initializes the CTG. The processing flow then proceeds to Step S141. The action content specified by the action content command newly received and the action target character subsequently received are then stored as new reserved information.

When the action executing image is displayed at Step S151, the control section 11 initializes the CTG (Step S152). Then, in the case where the action is terminated, the processing flow returns to Step S143 (Step S153). In the case where any one of predetermined conditions is met, it is determined at Step S153 that the action is terminated. The predetermined conditions may include a condition that the HP of the enemy character as the action target becomes zero, a condition that a new action content command is received, a condition that a new action target command is received, and a condition that a dash instruction command is received.

In this case, when the processing flow returns to Step S143, for example, the target line TL and the target line adding information AD that have the same aspect as the previous ones are displayed again, and the processes after Step S145 are executed.

As described above, in an aspect of the present embodiment, a battle may be executed by a battle system, which is referred to as an active dimension battle (ADB) using the CTG, on the field where a movement field is seamless to a battle field (the battle field is mixed with the movement field). Namely, for example, when the player character starts to attack an enemy character found in the field during movement (that is, movement field), a battle is to be started. Further, a battle may also be started when an enemy character found in the field during movement starts to attack the player character. In this regard, the player character may receive an attack from an enemy character that is not displayed in the character image (that is, an enemy character that is not displayed on the image display screen 51 because it is positioned, for example, behind the player character when the player character faces the back side of the image display screen 51). In an aspect of the present embodiment, the player character may receive an attack from such an enemy character after a target line is displayed. In such a case, a battle is also started when the player character receives such an attack.

In the foregoing example, the case where the player character executes an action such as an attack against an enemy character positioned within the action executable range has been described. However, in the case where a friend character executes an action such as an attack against an enemy character, or in the case where an enemy character executes an action such as an attack against the player character or a friend character, such an action can be executed against the character positioned within the action executable range in the same manner. Namely, a standard action range (for example, the action executable range) is set for a friend character and an enemy character in addition to the player character. Thus, a friend character or enemy character can also execute an action against the character that is positioned within the action executable range, which is determined on the basis of the standard action range.

For that reason, even though the player moves the player character without enemy character's noticing to avoid a battle against the enemy character (that is, the player character is moved so as not to be positioned within an action executable range of the enemy character), a battle mode may be shifted because, for example, the enemy character approaches the player character and the player character is thereby positioned within the action executable range of the enemy character. Since various kinds of battle representation can be executed in this way, the video game in the present invention is different from conventional video games in which a player character can escape from a battle mode by simply selecting an escape command. A scene that the player character is moved (that is, escapes) without enemy character's noticing can be realistically carried out, and it is possible to add a new flavor such as a flavor that which route does the player character select to escape to the video game.

As described above, the action executable range where an enemy character can execute an action content is defined in advance to thwart accomplishment of a predetermined object by the player character. Provided that the player character is positioned within the action executable range of the enemy character, a predetermined action content such as an attack by the enemy character is executed against the player character. Thus, it is possible to diversify shifting conditions to a battle scene and/or escaping conditions from a battle state, and this makes it possible to diversify a battle scene in a broad sense (including shift to a battle state, escape from a battle state).

As explained above, in the embodiment described above, the video game processing apparatus is constructed so that: an action content for the player character (for example, an attack with a weapon) is received; an action executable range in which the player character can execute the action content is identified in accordance with a predetermined range identifying rule (for example, the PC standard action range and the attack adding range defined for each of the weapons explained using FIG. 6); it is determined whether or not an action target character that is a target of the action content thus received exists within the action executable range; and the action content thus received is executed against the action target character in the case where it is determined that the action target character exists within the action executable range. Thus, the action content can be executed in the case where it is determined that the action target character exists within the action executable range. Therefore, it is possible to diversify action contents of a battle scene in the RPG, for example.

Namely, by operating the player character so that an enemy character is positioned within the action executable range, an action such as an attack against the enemy character can be executed. Thus, it is possible to diversify action contents of a battle scene in the RPG, for example.

Further, as described above, the video game processing apparatus is constructed so that: an action content for the player character is received; action executing standby time (for example, the measurement time shown at Step S145) from the time when the action content is received to the time when the action content becomes executable is identified (determined) in accordance with a predetermined time identifying rule (for example, the standard standby time shown in FIG. 7); and the action content thus received is executed when the action executing standby time is clocked (for example, "Yes" at Step S147). Thus, the action content can be executed when the action executing standby time determined in accordance with the predetermined time identifying rule elapses. Therefore, it is possible to diversify action contents of a battle scene in the RPG, for example.

Namely, it is possible to change the time from the time when the action content of the player character is specified to the time when the action content is executed by means of the contents of the time identifying rule. Therefore, it is possible to diversify action contents of a battle scene in the RPG, for example.

In this regard, for example, the action executing standby time is identified (determined) on the basis of at least one of the received action content (for example, a weapon used in an attack and the kind of magic) and the predetermined action speed level (for example, a speed level to be determined in accordance with the degree of difficulty of the video game) in accordance with the time identifying rule. In the case where the video game processing apparatus is constructed in this way, it is possible to determine the action executing standby time on the basis of at least one of the action content to be executed and the predetermined action speed level. Therefore, it is possible to diversify action contents.

Moreover, in the embodiment described above, the so-called active dimension battle (ADB) using the CTG on a common field where a movement field is seamless to a battle field is employed as a battle system. Thus, the player can enjoy the video game without conscious of switch between a battle mode and a non-battle mode. Therefore, the player can enjoy the video game without interrupting run of the video game, and the player can enjoy a battle scene without preventing the progress of the video game.

Furthermore, although it is not shown in the drawings in the embodiment described above, the measurement state of the action executing standby time (the state of the scale of the CTG) is displayed in a predetermined region of the image display screen. Thus, it is possible to inform the player of the degree of time remaining until the action content is executed.

Further, as described above, the video game processing apparatus is constructed so that: in the case where a new action content is received (for example, Step S141 after "Yes" at Step S148) before the received action content is executed (for example, when "No" is continuously determined at Step S149), the measurement of the action executing standby time is to be stopped and the scale of the CTG is initialized, and action executing standby time until the action content newly received can be executed is then determined (for example, Step S145). Thus, it is possible to cancel the action content previously specified and to specify a new action content.

Moreover, in the embodiment described above, the video game processing apparatus is constructed so that: an action content for the player character is received; an action executable range in which the player character can execute the received action content is identified (determined) in accordance with a predetermined range identifying rule; it is determined whether or not an action target character exists within the action executable range thus identified (determined); and the received action content is stored and a notification that the action content is stored is displayed (for example, the indication "Action" is displayed) in the case where it is determined that no action target character exists within the action executable range. Thus, the action content can be executed when it is determined that the action target character enters the action executable range. Therefore, it is possible to diversify action contents of a battle scene in the RPG, for example.

Namely, by operating the player character so that an enemy character is positioned within the action executable range in the state that the action content is stored (reserved), an action such as an attack against the enemy character can be executed. Thus, it is possible to diversify action contents of a battle scene in the RPG, for example. Therefore, the player can arbitrarily select a method of approaching an enemy character and arrangement of the player character by operating the player character. The player can also enjoy a variety of battles using timing of an attack against the enemy character, a positional relationship between the player character and the enemy character, topography of a virtual map and the like.

Furthermore, in the embodiment described above, the video game processing apparatus is constructed so that: it is monitored whether or not the action target character that is a target of the action content enters the action executable range when the action content is stored; the stored action content is executed against the action target character in the case where it is monitored (detected) that the action target character enters the action executable range; and the stored action content and the indication (for example, an indication "Action") for notifying the player that the action content has been stored are eliminated when the stored action content is executed. Thus, the video game processing apparatus can become a state that an action content to be next executed can be received when the stored action content is executed.

Further, in the embodiment described above, the video game processing apparatus is constructed so that a newly received action content is stored and a notification (for example, an indication "NEXT") that a new action content is stored is displayed in the case where the new action content is received while the action content previously received is executed. Thus, a next action content can be received and stored (reserved) before the executed action content is completed after starting to execute the action content.

Moreover, in the embodiment described above, the video game processing apparatus is constructed so that: it is determined whether or not an action target character that is a target of a new action content exists within the action executable range in the case where the new action content is stored when the execution of the action content is terminated; the new action content thus stored is executed against the action target character that is determined to exist within the action executable range; and the new action content thus stored and the notification (for example, the indication "NEXT") are eliminated when the stored new action content is executed. Thus, the next action content can be executed immediately after the execution of the previous action content is completed.

Furthermore, in the embodiment described above, the video game processing apparatus is constructed so that the stored action content is updated to the action content newly received in the case where the new action content is received before the action content that has been received is executed (for example, "Yes" at Step S148 and Step S141). Thus, the action content that has been received once can be changed to a next action content.

Further, in the embodiment described above, since the video game processing apparatus is constructed so that character identifying information may be displayed only in the vicinity of each of the characters that the player character can specify as an action target among the characters displayed in the character image, it is possible for the player to recognize the state of the characters only by confirming presence or absence of character identifying information. Thus, even though multiple characters are displayed in a common field in which movement and a battle are executed, each of the characters can be displayed so as to be easily distinguished by the player. Therefore, there is no requirement that movement and a battle are respectively executed in separate fields, and it is thereby possible to prevent realism (realistic sensation) from being lowered due to a change of fields. For this reason, the video game can proceed smoothly.

For example, in the case where the character identifying information is not displayed in the vicinity of a character that is displayed in the character image, the player can immediately recognize that the character is a character that the player character cannot specify as an action target. Further, for example, when a character, in the vicinity of which character identifying information is not displayed, approaches the player character and the character identifying information thereof is thereby displayed, it is possible for the player to immediately recognize that the character can become an action target. Therefore, it is possible for the player to easily recognize whether or not other characters existing in the character image can be specified as an action target (for example, an attacking target), such as in an example, when the player character is moved in the field.

Moreover, in the embodiment described above, since the video game processing apparatus is constructed so that the player is notified of the property of each of the characters (for example, friend, enemy and neutral) using a display state of the character identifying information, it is possible to cause the player to easily recognize the property of each of the characters.

In addition, in the embodiment described above, since the video game processing apparatus is constructed so that the player is also notified of the remaining ratio of HP using the display state of the character identifying information, it is possible for the player to recognize the remaining ratio of the HP of each of the characters.

Furthermore, in the embodiment described above, since the video game processing apparatus is constructed so that an action content command and an action target character are received and a target line for beforehand notifying a player of a character as an action target is displayed, it is possible for the player to immediately recognize an action entity and an action target.

Further, in the embodiment described above, since the video game processing apparatus is constructed so that the player is notified of the category or kind of action in the action content specified by the action content command using a display state of the target line (for example, color and line style), it is possible for the player to immediately recognize the category or kind of action, in addition to the action entity and the action target.

Moreover, in the embodiment described above, since the video game processing apparatus is constructed so that target line adding information for notifying the player of the action content specified by the action content command is displayed, it is possible to cause the player to recognize the action content in addition to the action entity and the action target immediately.

In this regard, in the embodiment described above, a case of receiving an action content command that is required to identify an action target character in the action executing process (see FIG. 9) has been described. In the case of receiving an action content command that is not required to specify an action target character (for example, a dash instruction command), an action executing image in accordance with the action content command is displayed at Step S151 without executing the processes at Steps S142 to S150, and the processing flow may be terminated without executing the processes at Steps S152 and S153.

Furthermore, in the embodiment described above, the video game processing apparatus is constructed so that the video game proceeds in a common field where a movement field is seamless to a battle field and an action is to be executed only when an action target character is positioned within an action executable range. Thus, for example, the control section 11 may determine that an action content is a back attack in the case where the player character is caused to approach an enemy character from behind and the enemy character is thereby positioned within the action executable range during a state where the scale of the CTG is filled up (see "Yes" at Step S147) after an action content command for an attack is received (see Step S141) and the enemy character is selected (received) as an action target character (see Step S142). In the case where the control section 11 determines that an action content is a back attack, the process is controlled so that damage to the enemy character by the back attack may become greater than that by a normal attack (not back attack), for example. By constructing the video game processing apparatus in this manner, it is possible to vary the effect of an attack in accordance with a position of the player character during a battle with respect to an enemy character, and this makes it possible to increase variations in a method of playing the video game during a battle. In addition, since the player can carry out the back attack by his or her skill, it is possible to increase the player's interest.

In this regard, although it is not particularly referred to in the embodiment described above, in a similar manner to the player character, when an action to be executed and the target are determined, time measurement is started by the CTG after displaying a target line toward the target, and the action is executed when the scale of the CTG is filled up. Namely, for example, when the enemy character attacks the player character, the state that the enemy character attacks the player character is displayed after the target line is displayed from the enemy character to the player character. In this regard, it is preferable that the color, line style or the like of a target line is different from each other among a target line displayed from the player character to an enemy character, a target line displayed from an enemy character to the player character, and a target line displayed from the player character to other friend character.

Further, although it is not particularly referred to in the embodiment described above, for example, multiple target lines or one target line may be displayed toward multiple action target characters or one action target character representative of the multiple action target characters at Step S143 in the case where an action content command is received (see Step S141) and multiple characters are received as the multiple action target characters (see Step S142). On the other hand, even if one character is received as an action target character (see Step S142), an attack influences the action target character and other characters positioned around the action target character in the case where the received attack is, for example, an attack influencing a wide range. In this case, a target line is displayed toward the action target character at Step S143, a state that the attack influences the action target character and other characters positioned around the action target character may then be displayed at Step S151.

Moreover, although it is not particularly referred to in the embodiment described above, receiving a new action content command is forbidden (or prohibited) until the scale of the CTG becomes filled up after an action content command is received. In the embodiment described above, the action content receiving standby time until reception of a next action content is allowed after receiving the action content command (or reception restricted time until restrictions to receive an action content is removed after receiving the action content command) is determined at Step S145. Namely, the measurement time determined at Step S145 becomes the action content receiving standby time (reception restricted time). Thus, it is possible to forbid receiving an action content until the action content receiving standby time or the reception restricted time elapses.

Namely, in the embodiment described above, the video game processing apparatus is constructed so that a time measuring state of the action content receiving standby time or the reception restricted time (receiving time limit) (for example, a state of the scale of the CTG) is displayed. Thus, it is possible to inform the player of an extent of the remaining time until the restriction of receiving the action content is removed. In this regard, the action content receiving standby time or the reception restricted time may be different from the measurement time determined at Step S145. In this case, the time measuring state of the measurement time may be displayed separately from the time measuring state of the action content receiving standby time or the reception restricted time.

Furthermore, although it is not particularly referred to in the embodiment described above, the video game processing apparatus may control a friend character so that, when the player applies a predetermined instruction (for example, an attack instruction) to the friend character, the friend character adjusts an attack content and/or a distance from an enemy character in accordance with equipped weapons, and automatically approaches the enemy character to attack the enemy character.

Further, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the invention.

Moreover, although one example of a game control for the RPG has been described in the embodiment described above, the technique of the present invention can be applied to other kinds of video games that include multiple characters in a screen of such a video game, as those skilled in the art will readily recognize without departing from the scope of spirit of the present invention.

Further, although an aspect of the present invention has been described with the video game apparatus 100 as an example, the present invention is not limited thereto. The present invention can be applied to various apparatuses such as a personal computer, a cellular phone terminal, a portable game apparatus and/or the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Moreover, in the embodiment described above, although it has been described that game data for causing the video game apparatus main body 10 (video game apparatus 100) to execute various processes described above (that is, various data such as control program data used for the video game) are stored in the storage medium 70, the video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the above example, such data may include at least control program data for causing a computer to execute the image generating process in the embodiment as described above.

The present invention can be applied to a video game machine, a personal computer, a cellular phone terminal, a portable game apparatus, or the like, or any combination thereof that causes an image display apparatus to display multiple characters including a player character on an image display screen, and controls an action of each of the multiple characters displayed on the image display screen in response to an operation by a player. Therefore, the present invention is useful.

What is claimed is:

1. A video game processing apparatus that causes an image display apparatus to display multiple characters of a video game, including a player character, on an image display screen of the image display apparatus, the video game processing apparatus controlling progress of the video game by controlling an action of each character to be displayed on the image display screen in accordance with operations by a player, the video game processing apparatus comprising:
    an action content receiver that receives an action content for the player character;
    an action executing standby time identifier that identifies an action executing standby time from the time when the action content receiver receives the action content to the time when the received action content becomes executable in accordance with a predetermined time identifying rule;
    a timer that times the action executing standby time identified by the action executing standby time identifier;
    an action executable range identifier that identifies an action executable range in which the player character can execute the action content received by the action content receiver in accordance with a predetermined range identifying rule;
    an action target character availability determiner that determines whether an action target character that is a target of the action content received by the action content receiver exists within the action executable range identified by the action executable range identifier when the timer times the action executing standby time;
    an action content memory that stores the action content received by the action content receiver when the action target character availability determiner determines that no action target character exists within the action executable range;
    an action content stored display controller that causes the image display apparatus to display a notification that the action content is stored in the action content memory;
    an action target character monitor that monitors whether the action target character that is the target of the action content enters the action executable range when the action content is stored in the action content memory;
    an action executor that executes the action content received by the action content receiver against the action target character when the action target character determiner determines that the action target character exists within the action executable range, and executes the action content stored in the action content memory against the action target character that is monitored to enter the action executable range by the action target character monitor; and
    an eliminator that eliminates the action content stored in the action content memory and the notification by the action content stored display controller when the action content stored in the action content memory is executed by the action executor.

2. The video game processing apparatus according to claim 1, wherein the action executing standby time identifier identifies the action executing standby time on the basis of at least one of the action content received by the action content receiver and a predetermined action speed level in accordance with the time identifying rule.

3. The video game processing apparatus according to claim 1, further comprising:
    a time status display controller that causes the image display apparatus to display a time status of the action executing standby time timed by the timer.

4. The video game processing apparatus according to claim 1, further comprising:
    a receiving interval identifier that identifies any one of an action content receiving standby time from the time when the action content receiver receives the action content to the time when a next action content is allowed to be received and a receiving time limit from the time when the action content receiver receives the action content to the time when receiving limit of the action content is removed.

5. The video game processing apparatus according to claim 4, further comprising:
    a receiving interval timer that times one of the action content receiving standby time and the receiving time limit identified by the receiving interval identifier; and
    a receiving interval timer status display controller that causes the image display apparatus to display a time status of the receiving interval timer.

6. The video game processing apparatus according to claim 1, wherein the timer stops timing the action executing standby time when the action content receiver receives a new action content before the action content that has already been received by the action content receiver is executed by the action executor, and
    wherein the action executing standby time identifier identifies the action executing standby time until the new action content received by the action content receiver becomes executable.

7. The video game processing apparatus according to claim 1, wherein the action content memory stores a new action content when the action content receiver receives the new action content while the action content received by the action content receiver is executed by the action executor, and wherein the action content stored display controller causes the image display apparatus to display a notification that the new action content is stored in the action content memory.

8. The video game processing apparatus according to claim 7, wherein the action target character monitor monitors whether an action target character that is a target of the new action content exists within the action executable range when the new action content is stored in the action content memory and when the execution of the action content by the action executor is terminated, wherein the action executor executes the new action content stored in the action content memory against the action target character that is detected to exist within the action executable range by the action target character monitor, and wherein the eliminator eliminates the new action content stored in the action content memory and the notification by the action content stored display controller when the new action content stored in the action content memory has been executed by the action executor.

9. The video game processing apparatus according to claim 7, wherein the action content memory updates the stored action content to the new action content when the new action content is received by the action content receiver before the action executor executes the stored action content.

10. The video game processing apparatus according to claim 1, wherein the multiple characters include a non-player character that thwarts accomplishment of a predetermined object by the player character, and a non-player character action executable range in which the non-player character can execute an action content is defined for the non-player character in advance, and wherein the video game processing apparatus further comprises:

a non-player character action executor that executes a predetermined action content by the non-player character against the player character when the player character exists within the non-player character action executable range.

11. The video game processing apparatus according to claim 1, further comprising:

a character image display controller that causes the image display apparatus to display a character image in which the characters existing in a field of view of a virtual camera in a field are drawn on the display screen, various actions, including movement of the player character and a battle by the player character, being allowed in the field, a same time base being applied to the multiple characters, including the player character, which exist in the field;

an action content beforehand notifying image drawer that draws an action content beforehand notifying image in the character image displayed by the character image display controller, the action content beforehand notifying image beforehand notifying the player that the action content received by the action content receiver will be executed against the action target character; and an action content executing image drawer that draws an action content executing image in the character image displayed by the character image display controller, the action content executing image notifying the player of an executing state that the action content received by the action content receiver is executed against the action target character.

12. The video game processing apparatus according to claim 11, wherein the action content beforehand notifying image drawer draws the action content beforehand notifying image for beforehand notifying the player that a predetermined category of action content received by the action content receiver will be executed against the action target character.

13. The video game processing apparatus according to claim 12, wherein the action content beforehand notifying image drawer draws the action content beforehand notifying image for beforehand notifying the player of the action target character by one of a straight line and a curved line that is drawn from a vicinity of the player character to a vicinity of the action target character one of continuously and intermittently, and for beforehand notifying the player of the category of action content received by the action content receiver by a display state of one of the straight line and the curved line.

14. The video game processing apparatus according to claim 1, wherein the action content memory updates the stored action content to the new action content when the new action content is received by the action content receiver before the action executor executes the stored action content.

15. A method of processing a video game by causing an image display apparatus to display multiple characters of the video game, including a player character, on an image display screen of the image display apparatus, the method controlling progress of the video game by controlling an action of each character to be displayed on the image display screen in accordance with operations by a player, the method comprising:

receiving an action content for the player character;

identifying an action executing standby time from the time when the action content is received to the time when the received action content becomes executable in accordance with a predetermined time identifying rule;

timing the identified action executing standby time;

identifying an action executable range in which the player character can execute the received action content in accordance with a predetermined range identifying rule;

determining whether an action target character that is a target of the received action content exists within the identified action executable range when the action executing standby time is timed in the timing of the identified action executing standby time;

storing the action content received in the receiving of an action content in an action content memory when it is determined that no action target character exists within the action executable range in the determining of whether an action target character exists within the identified action executable range;

causing the image display apparatus to display a notification that the action content is stored in the action content memory;

monitoring whether the action target character that is the target of the action content enters the action executable range when the action content is stored in the action content memory;

one of executing the received action content against the action target character when it is determined that the action target character exists within the action executable range and executing the action content stored in the action content memory against the action target character that is monitored to enter the action executable range in the monitoring of whether the action target character enters the action executable range; and eliminating the action content stored in the action content memory and the notification displayed in the causing of the image display apparatus to display a notification when the action content stored in the action content memory is executed.

16. A storage medium encoded with a computer program product for processing a video game, progress of the video game being controlled by causing an image display apparatus to display multiple characters of the video game, including a player character, on an image display screen of the image display apparatus, and controlling an action of each character to be displayed on the image display screen in accordance with operations by a player, the computer program product causing a computer to execute:

receiving an action content for the player character;

identifying an action executing standby time from the time when the action content is received to the time when the received action content becomes executable in accordance with a predetermined time identifying rule;

timing the identified action executing standby time;

identifying an action executable range in which the player character can execute the received action content in accordance with a predetermined range identifying rule;

determining whether an action target character that is a target of the received action content exists within the identified action executable range when the action executing standby time is timed in the timing of the identified action executing standby time;

storing the action content received in the receiving of an action content in an action content memory when it is determined that no action target character exists within the action executable range in the determining of whether an action target character exists within the identified action executable range;

causing the image display apparatus to display a notification that the action content is stored in the action content memory;

monitoring whether the action target character that is the target of the action content enters the action executable range when the action content is stored in the action content memory;

one of executing the received action content against the action target character when it is determined that the action target character exists within the action executable range and executing the action content stored in the action content memory against the action target character that is monitored to enter the action executable range in the monitoring of whether the action target character enters the action executable range; and eliminating the action content stored in the action content memory and the notification displayed in the causing of the image display apparatus to display a notification when the action content stored in the action content memory is executed.

* * * * *